July 10, 1934.    E. P. SILICEO    1,966,315

ELECTRIC MOTOR

Filed March 28, 1933

E. P. Siliceo
INVENTOR

By Marks & Clerk
Attys.

Patented July 10, 1934

1,966,315

UNITED STATES PATENT OFFICE 1,966,315

ELECTRIC MOTOR

Emilio Pérez Siliceo, Mexico, Mexico

Application March 28, 1933, Serial No. 663,229
In Mexico March 30, 1932

1 Claim. (Cl. 172—126)

This invention refers to an electric motor different from others in use, because it has simpler means for converting the electric current into movement, using the vibration of a spring.

The characteristic details of this motor are shown in the accompanying drawing, in which the same numbers of reference in all the figures refer to the same parts.

Figure 1:
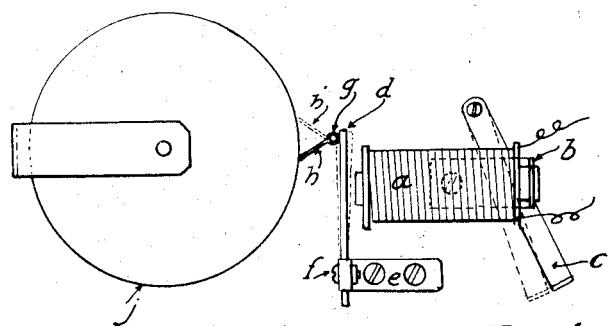
Figure 2:
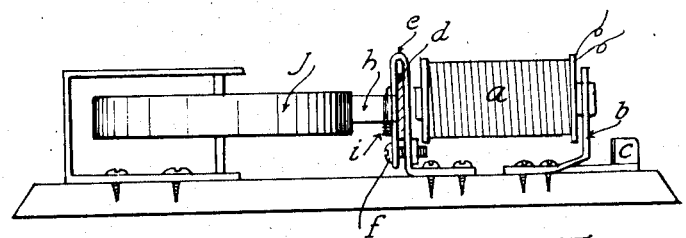
Figure 3:
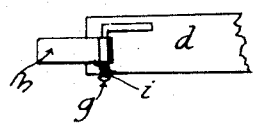

Fig. 1 is a front view of the motor;
Fig. 2 is a side view of same.
Fig. 3 shows a form of the pawl.

The motor is formed by one or several coils $a$ mounted upon a support $b$ that may be moved slightly with the lever $c$ when the same comes below the aforesaid support $b$. In front of the coil $a$ is the spring ($d$) supported by the piece $e$. This piece is designed so that the spring $d$ may be run through it in order that, when its length required for the best vibration according to the cycles of the current has been established, it may be fixed by means of the screw $f$. An axle $g$ is fixed to the said spring $d$ and carries a pawl $h$ which may rotate on said axle and which is held against the wheel or mover by means of the spring $i$.

When an intermittent current is passed through the coils $a$ the spring $d$ is attracted causing vibration, which movement is transmitted to the wheel or mover $j$ by means of the pawl $h$. The mover, represented in the drawing by the wheel $j$, carries a rubber band, insulated tape or any other similar material to better receive the vibration. By means of the lever $c$ the electro-magnet may be moved towards or away from the spring $d$ thus diminishing or increasing the electromagnetic influence and therefore the vibration of the spring, thus regulating the speed of the wheel.

When it is desired to use direct current, the intermittence may be produced by the already known means. The pawl according to the position it occupies as $h$ or $h'$ will produce movement of the wheel in one direction or the other.

The motor according to the present invention is capable of developing at a small speed a force big enough to move the wheel, thus avoiding the customary speed reducing means.

Having thus described my invention, what I claim is:

An electric motor comprising a rotatable member, an electromagnet, a spring armature arranged to be attracted by said magnet, a pivoted pawl carried by said armature and engaging said rotatable member, a support for one end of said armature, means for adjustably securing said armature in said support, a support for the electromagnet, and means coacting with the last mentioned support for displacing the electromagnet with relation to the armature.

EMILIO PEREZ SILICEO.